United States Patent [19]

Toshimitsu et al.

[11] Patent Number: 4,627,637

[45] Date of Patent: Dec. 9, 1986

[54] DAMPING FORCE-VARIABLE DAMPER DEVICE FOR VEHICLES PROVIDED WITH POWER STEERING DEVICE

[75] Inventors: Yoshihiko Toshimitsu, Asaka; Toshihiko Aoyama, Tsurugashima; Takashi Ishida, Kawaguchi, all of Japan

[73] Assignee: Honda Giken Kogyo Kabushiki Kaisha, Tokyo, Japan

[21] Appl. No.: 714,426

[22] Filed: Mar. 21, 1985

[30] Foreign Application Priority Data

Mar. 29, 1984 [JP] Japan .................................. 59-61873

[51] Int. Cl.⁴ .................................................. F16F 9/46
[52] U.S. Cl. .................................... 280/714; 267/11 A
[58] Field of Search ............. 280/714, 709; 267/11 A, 267/64.11; 188/300

[56] References Cited

U.S. PATENT DOCUMENTS 4,170,279 10/1979 Pelletier .............................. 280/714
4,313,529  2/1982 Kato et al. .......................... 280/714

Primary Examiner—Richard A. Bertsch
Attorney, Agent, or Firm—Armstrong, Nikaido, Marmelstein & Kubovcik

[57] ABSTRACT

In a vehicle which is provided with a power steering device having an oil passage or an oil chamber whose pressure increases to a high level as a steering angle becomes large; and a damper device consisting of a cylinder filled therein with a working oil and a piston fitted slidably in the cylinder to divide the interior thereof into upper and lower oil chambers, the damper device being adapted to damp the relative movements of a chassis and a wheel support member, the damper device is characterized in that it is provided with a variable throttle mechanism interposed between the upper and lower oil chambers and operable to increase its degree of restriction in proportion to the rise of pressure in the oil passage or oil chamber of the power steering device. This simply constructed device is obtained at a low cost and enables the damping force to vary continuously without use of sensors and processor.

3 Claims, 3 Drawing Figures

DAMPING FORCE-VARIABLE DAMPER DEVICE FOR VEHICLES PROVIDED WITH POWER STEERING DEVICE

BACKGROUND OF THE INVENTION

1. Field of the Invention

This invention relates to a damping force-variable damper device for vehicles provided with a power steering device, and more particularly to a structure for rendering variable the damping force of a damper in a vehicle which is provided with a power steering device having an oil passage or an oil chamber of which internal pressure increases to a high level as the steering angle becomes large; and a damper device which includes a cylinder filled therein with a working oil, and a piston fitted slidably in the cylinder to divide the interior thereof into an upper oil chamber and a lower oil chamber, the damper device being adapted to damp the relative movements of a chassis and a wheel support member.

2. Description of the Prior Art

To regulate the damping force of a damper device for vehicle in accordance with the conditions where the vehicle is used and thereby to attain a satisfactory steerability of the vehicle and riding comfort, an electronic control means is generally used in the prior art. In this art, vehicle speed, steering angle and centripetal acceleration are detected electrically, and a rotary solenoid provided at an upper portion of a piston rod in the damper device is actuated in response to detected signals of such information, thereby selecting via a control rod a fixed orifice provided in a piston. In this electronic control means, however, the degree of opening of the orifice varies in a stepped manner, and the range where the variable damping force can be set is reduced. It is necessary that a vehicle speed sensor, a steering angle sensor and a centripetal acceleration sensor be provided, and that a signal-processing procedure program be input to a processor such as a microcomputer. This greatly increases the cost of manufacturing the damper device.

SUMMARY OF THE INVENTION

The present invention has been developed in view of the above-mentioned facts. It is an object of the present invention to provide an inexpensive, highly reliable damping force-variable damper device in which a simply constructed variable orifice mechanism effectively utilizing the hydraulic pressure in a power steering device is installed so as to vary the damping force continuously.

The above and other objects as well as advantageous features of the invention will become apparent from the following description of the preferred embodiment taken in conjunction with the accompanying drawings.

BRIEF DESCRIPTION OF THE DRAWINGS:

The accompanying drawings show an embodiment of the present invention, wherein.

DESCRIPTION OF THE PREFERRED EMBODIMENT

Figure 1:
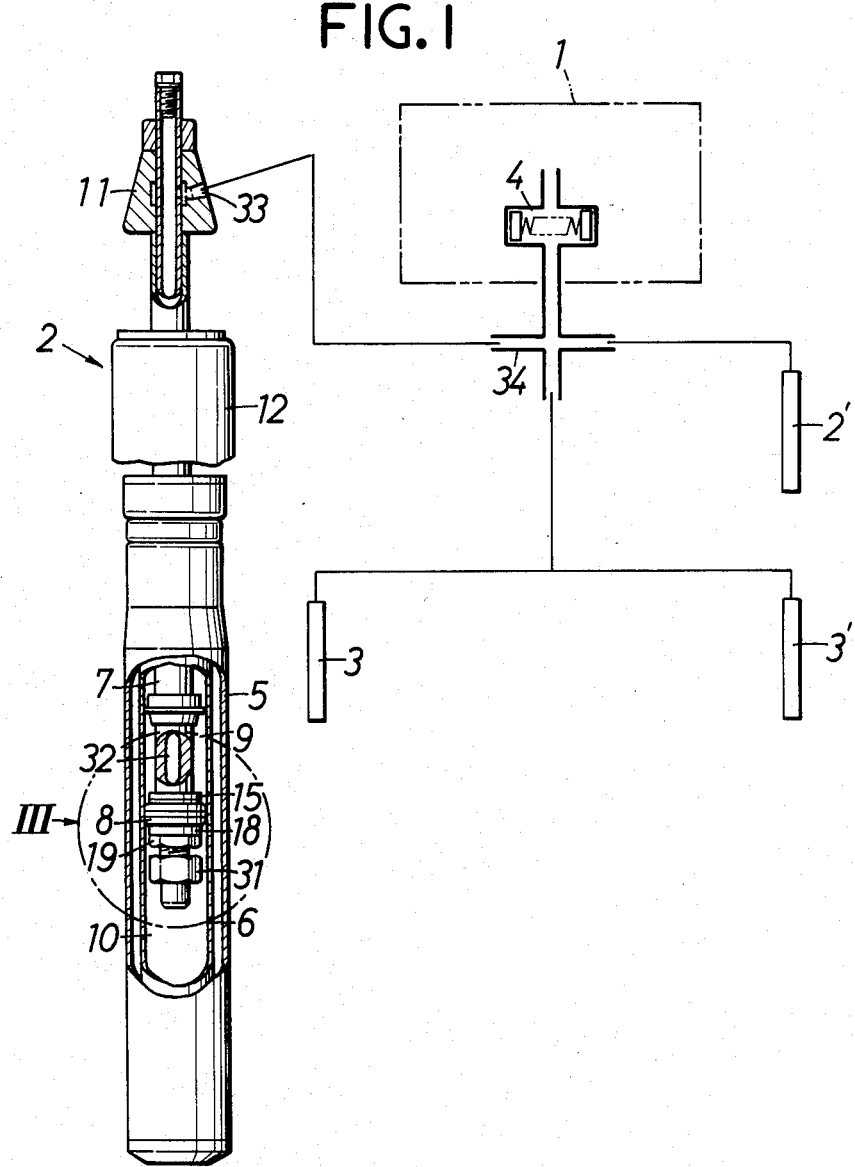
FIG. 1 is a simplified diagram of a hydraulic system as a whole.

An embodiment of the present invention will now be described with reference to the drawigns. First, referring to FIG. 1, a power steering device 1 is provided in a vehicle (not shown), and the damping force of damper devices 2, 2'; 3, 3', which are provided respectively to the left and right front wheels and left and right rear wheels of the vehicle, is varied in accordance with the pressure in a reaction oil chamber 4 in the power steering device 1.

Figure 2:
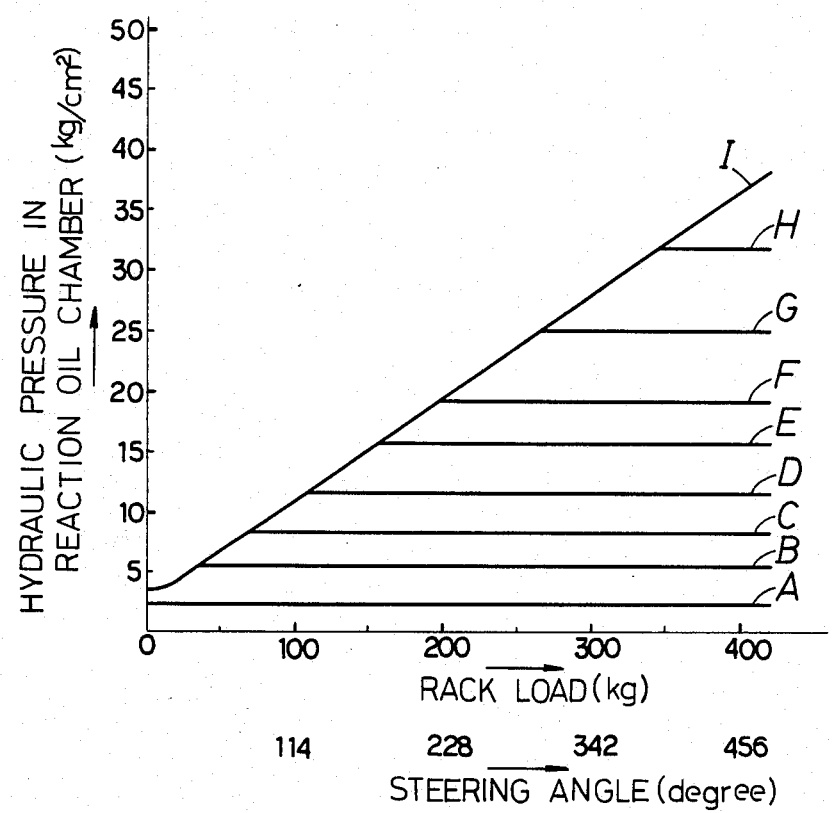
FIG. 2 is a graph showing the relationship between the steering angle of a power steering device and the pressure in a reaction oil chamber.

The power steering device 1 is of a so-called vehicle speed-responsive type, and is provided with the reaction oil chamber 4 so as to feed back to the driver a small force when the vehicle is stopped or steered at a low speed, and a large force, which is proportional to a road surface load, when the vehicle is steered at a high speed. A hydraulic pressure from a hydraulic pump (not shown) is supplied to this reaction oil chamber 4 after having been controlled in accordance with vehicle speed, this hydraulic pressure being varied, for example, as shown in FIG. 2. Referring to FIG. 2, the letter A indicates the initial vehicle speed, that is, 0 km/H and the letters B–I denote vehicle speeds 20 km/H–90 km/H at intervals of 10 km/H in order, and this graph shows that the hydraulic pressure in the reaction oil chamber 4 increases in proportion to vehicle speed.

The construction of the damper devices 2, 2'; 3, 3' will now be described. Since all of these damper devices 2, 2'; 3, 3' have the same basic construction, the construction of only the damper device 2 corresponding to the left front wheel will be described in detail.

The damper device 2 consists of a cylinder 6 set firmly in an outer cylinder 5 and filled with an oil therein, and a piston 8 slided in the cylinder 6 and fitted firmly around a piston rod 7 which projects upward from the outer cylinder 5. The interior of the cylinder 6 is divided into upper and lower oil chambers 9 and 10 by the piston 8. The upper end of the piston rod 7 is secured to a chassis (not shown), and the lower end of the outer cylinder 5 to a wheel support member (not shown). Thus, the damper device 2 is rendered capable of damping relative vertical movements between the chassis and wheel support member.

A mounting member 11 for securing the piston rod 7 to the chassis is fitted firmly around the upper portion of the rod 7 which projects from the outer cylinder 5 and the cylinder 6, and a dust cover 12 for enclosing the outer cylinder 5 is fastened to the portion of the piston rod 7 which is lower than the mounting member 11.

Figure 3:
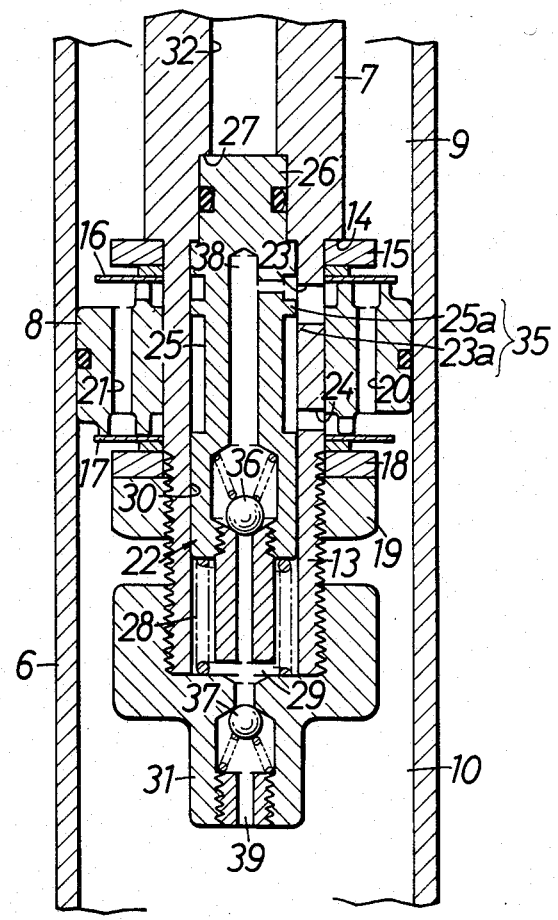
FIG. 3 is an enlarged section of the circle portion of FIG. 1 as designated by an arrow III.

Referring to FIG. 3, the lower end portion of the piston rod 7, which is in the interior of the cylinder 6, is provided with a cylindrical smaller-diameter portion 13 via a stepped portion 14, which portion 13 has screw threads formed on its outer circumferential surface and is formed integrally with the piston rod 7 so as to project downward. A flange 15, a plate type valve body 16, the piston 8, a plate type valve body 17 and a flange 18 are fitted in the mentioned order around the cylindrical portion 13, and finally, a nut 19 is screw-fitted to the cylindrical portion 13 so that the piston 8 is united with the piston rod 7. The piston 8 is provided with a pair of passages 20, 21 for communication between the upper and lower oil chambers 9, 10. One plate type valve body 16 allows the oil to flow only from the lower oil chamber 10 into the upper oil chamber 9 through one passage 20, and the other plate type valve body 17 allows the oil flow only from the upper oil chamber 9 into the lower oil chamber 10 through the other passage 21. Owing to such a construction, a damping force is produced against the relative vertical movements of the piston 8 and cylinder 6.

In the damper device 2, a variable throttle mechanism 22, of which the degree of restriction increases in proportion to the pressure in the reaction oil chamber, i.e. the steering angle, is interposed between the upper and lower oil chambers 9, 10.

The variable throttle mechanism 22 consists of an upper communication passage 23 communicating with the upper oil chamber 9, a lower communication passage 24 communicating with the lower oil chamber 10, a plunger 26 provided at its outer circumferential surface with an annular groove 25 which communicates with both of the communication passages 23, 24, a hydraulic chamber 27 facing to and defined by the upper end of the plunger 26, and a spring chamber 29 facing to and defined by the lower end of the plunger 26 and housing a spring 28 therein. The piston rod 7 is provided at its lower end portion with a slide bore 30 which is opened at the lower end thereof, and the lower opened end of this slide bore 30 is closed with a cap 31 screw-fitted around the tip end of cylindrical portion 13. The plunger 26 is fitted slidably in the slide bore 30. The hydraulic chamber 27 is defined by the upper ends of the plunger 26 and slide bore 30, and the spring chamber 29 by the lower end of the plunger 26 and the cap 31. The piston rod 7 is provided therein with a hydraulic pressure supply passage 32 which communicates concentrically with the hydraulic chamber 27, this passage 32 also communicating with a hydraulic pressure supply bore 33 which is formed in the mounting member 11. A hydraulic pressure supply pipe 34 leading to the hydraulic pressure supply bore 33 is connected to the mounting member 11 and communicates with the reaction oil chamber 4 in the power steering device 1. Thus, the hydraulic pressure in the reaction oil chamber 4 is introduced into the hydraulic chamber 27.

The upper and lower communication passages 23, 24 are provided in the portions of the piston rod 7 which correspond to upper and lower portions of the piston 8, respectively, and an upper edge 25a of the annular groove 25 and a lower edge 23a of an inside opening of the upper communication passage 23 constitute a variable throttle 35. The hydraulic pressure applied to the upper end of the plunger 26 works so as to increase the degree of restriction of the variable throttle 35, whereas the resilient force of the spring 28 in the spring chamber 29 works to decrease the degree of restriction thereof.

A check valve 36 is provided between the spring chamber 29 and the upper oil chamber 9, and a check valve 37 is provided between the spring chamber 29 and the lower oil chamber 10. A relief oil passage 38 is provided in the plunger 26 so as to extend between the spring chamber 29 and the upper communication passage 23, and the check valve 36 is disposed in an intermediate portion of the relief oil passage 38. A relief oil passage 39 is provided in the cap 31 so as to connect between the spring chamber 29 and the lower oil chamber 10, and the check valve 37 is disposed in an intermediate portion of the relief oil passage 39. These check valves 36, 37 work to allow, when the hydraulic pressure in the spring chamber 29 is high, the pressure oil therein to flow into one of the upper and lower oil chambers 9, 10, the pressure in which is lower than that in the other. This enables a smooth operation of the plunger 26, i.e. a smooth operation of the variable throttle 35.

The operation of this embodiment will now be described. If the vehicle is moving slowly while being steered by a steering wheel, the hydraulic pressure in the reaction oil chamber 4 is comparatively low, so that the pressure in the hydraulic chamber 27 in the variable throttle mechanism 22 is comparatively low. The degree of restriction of the variable throttle 35 is comparatively low; hence, the damping force is set low. When the vehicle speed is high, the hydraulic pressure in the reaction oil chamber 4 is high in response to the steering angle. The degree of restriction of the variable throttle 35 is high, and great damping force can be obtained. From the aspect of the vehicle performance, the above operation can be expressed as follows. When the vehicle is moving slowly, a soft ride can be enjoyed, and, when the vehicle is moving fast, the suppression of rolling of the chassis due to the steering operation can be expected. The hydraulic reaction force (the hydraulic pressure in the reaction oil chamber 4) occurring while the vehicle moves fast has such characteristics that it increases in proportion to the road surface load. Meanwhile, the level of the cornering force working on the tires is determined by the level of radius of a turn made by the vehicle at the same vehicle speed, and this cornering force works as a rack reaction force, so that the level of the hydraulic pressure in the reaction oil chamber 4 depends on centripetal acceleration. In a hydraulic reaction force-proportioned region, the level of the hydraulic reaction force indicates that of the centripetal acceleration. In other words, the load-proportioned reaction pressure at a high speed running $\propto$ rack reaction force $\propto$ cornering force $\propto$ centripetal acceleration. Therefore, a centripetal acceleration sensor need not be provided.

In the above-described embodiment, damping force varies in accordance with hydraulic pressure in the reaction oil chamber 4 in the vehicle speed-responding power steering device 1. The present invention may be embodied in another mode in a power steering device having an open-center control valve in such a manner that the discharge hydraulic pressure from a hydraulic pump is introduced into a hydraulic chamber 27 in a variable throttle mechanism 22. In such a power steering device, the hydraulic pressure in a discharge oil passage of a hydraulic pump is low while the vehicle runs straight forward, and this hydraulic pressure can be increased by operating the steering wheel. If this discharge oil passage is put into communication with the hydraulic chamber 27, the damping force of a damper device can be increased when the steering wheel is operated. However, in this case, when the steering angle is large during low speed travelling of the vehicle, it is expected that the ride becomes stiff and uncomfortable for the passengers. In still another mode of embodiment of the present invention, the reaction pressure of a so-called hydraulic reaction force limiting system may be introduced into a hydraulic chamber 27. This embodiment also has the same effect as mentioned above.

In the present invention, a variable throttle mechanism, the degree of restriction of which increases in proportion to the increase of pressure in an oil passage or an oil chamber of a power steering device, is interposed between the upper and lower oil chambers of a damper device. Since the pressure in the oil passage or oil chamber of the power steering device increases in proportion to the steering angle, the damping force can be varied. Namely, the damping force can be varied continuously. Moreover, a sensor and a microcomputer as used in a conventional electronically-controlled damper are made unnecessary. Thus, a damper device in the present invention can be obtained cheaply by merely providing a thin pipe, such as a brake pipe in a conventional damper device of this kind.

The present invention is not, of course, limited to the above embodiments; it may be modified in various ways within the scope of the appended claims.

What is claimed is:

1. In a vehicle including: a power steering device having an oil container whose pressure increases to a high level as a steering angle becomes large; and a damper device consisting of a cylinder filled therein with a working oil and a piston fitted slidably in said cylinder to divide an interior of the cylinder into an upper oil chamber and a lower oil chamber, said damper device being adapted to damp relative movements of a chassis and a wheel support member, a damping force-variable damper device wherein a variable throttle mechanism is interposed between said upper and lower oil chambers, said variable throttle mechanism being operable to increase a degree of restriction thereof in response to an increase of the pressure in said oil container of said power steering device.

2. A damping force-variable damper device according to claim 1, wherein said variable throttle mechanism comprises an upper communication passage communicating with said upper oil chamber, a lower communication passage communicating with said lower oil chamber, a plunger provided at an outer circumferential surface thereof with an annular groove which communicates with both of said upper and lower communication passages and which has opposite end edges, one of the end edges cooperating with an opening end edge of one of said two communication passages to form a variable throttle, a hydraulic chamber defined so as to face to one end of said plunger and communicate with said oil container for allowing a hydraulic pressure to be applied to said plunger in a direction in which the degree of restriction of said variable throttle increases, and a spring chamber defined so as to face to another end of said plunger and housing therein a spring which urges said plunger in a direction in which the degree of restriction of said variable throttle decreases.

3. A damping force-variable damper device according to claim 2, wherein check valves are provided between said spring chamber and said upper oil chamber and between said spring chamber and said lower oil chamber, respectively, said check valves being adapted, when one of said oil chambers has a lower pressure than the other, to allow a pressure oil in said spring chamber to flow out therefrom into said lower-pressure side one oil chamber.

* * * * *